(12) United States Patent
Clerc et al.

(10) Patent No.: US 10,587,676 B2
(45) Date of Patent: *Mar. 10, 2020

(54) TRANSMITTING DATA INCLUDING PIECES OF DATA

(71) Applicant: International Business Machines Corporation, Armonk, NY (US)

(72) Inventors: David Clerc, Verbier (CH); Jacques Fontignie, Vernier (CH); Luis Garcés-Erice, Zurich (CH); John G. Rooney, Zurich (CH); Paolo Scotton, Zurich (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/014,872

(22) Filed: Jun. 21, 2018

(65) Prior Publication Data

US 2018/0302463 A1   Oct. 18, 2018

Related U.S. Application Data

(63) Continuation of application No. 13/597,651, filed on Aug. 29, 2012, now Pat. No. 10,057,106, which is a (Continued)

(30) Foreign Application Priority Data

May 30, 2011   (EP) .................................... 11168100

(51) Int. Cl.
*H04L 29/08* (2006.01)
*H04L 29/06* (2006.01)
*H04N 21/218* (2011.01)

(52) U.S. Cl.
CPC ............ *H04L 67/06* (2013.01); *H04L 65/604* (2013.01); *H04L 67/1097* (2013.01); *H04L 65/607* (2013.01); *H04N 21/2181* (2013.01)

(58) Field of Classification Search
CPC combination set(s) only.
See application file for complete search history.

(56) References Cited

U.S. PATENT DOCUMENTS 6,374,254 B1   4/2002   Cochran et al.
7,143,143 B1   11/2006   Thompson
(Continued)

OTHER PUBLICATIONS

Ahmed, et al., "Group-Based Management of Distributed File Caches", Proceedings of the 22nd International Conference on Distributed Computing Systems (ICDCS'02), 2002 IEEE.
(Continued)

*Primary Examiner* — El Hadji M Sall
(74) *Attorney, Agent, or Firm* — Kurt P. Goudy, Esq.; McGinn IP Law Group, PLLC

(57) ABSTRACT

A computer implemented method includes storing data in a server, selecting a block of data from the stored data, storing the selected block of data in a cache memory of the server, and transmitting a block availability signal to a client, the block availability signal including an identifier of the selected block of data and indicating that the selected block of data is stored in the cache memory and is available to be accessed by the client.

20 Claims, 5 Drawing Sheets

Related U.S. Application Data continuation of application No. 13/483,141, filed on May 30, 2012, now Pat. No. 10,075,505.

(56) References Cited

U.S. PATENT DOCUMENTS

| | | | |
|---|---|---|---|
| 7,219,153 B1 | 5/2007 | Day | |
| 7,349,901 B2 | 3/2008 | Ramarathnam et al. | |
| 7,398,382 B2 | 7/2008 | Rothman et al. | |
| 7,725,704 B1 | 5/2010 | Beaverson et al. | |
| 8,601,214 B1 | 12/2013 | Chakalian et al. | |
| 2001/0029531 A1 | 10/2001 | Ohta | |
| 2002/0159632 A1* | 10/2002 | Chui | G06T 9/00 382/168 |
| 2006/0026663 A1 | 2/2006 | Kortum | |
| 2006/0095939 A1* | 5/2006 | Jutzi | H04N 7/52 725/78 |
| 2006/0112140 A1 | 5/2006 | McBride | |
| 2007/0124309 A1 | 5/2007 | Takase et al. | |
| 2007/0174873 A1 | 7/2007 | Griggs | |
| 2007/0250513 A1 | 10/2007 | Hall et al. | |
| 2007/0274489 A1 | 11/2007 | Yamamura et al. | |
| 2008/0155613 A1 | 6/2008 | Benya | |
| 2009/0059265 A1* | 3/2009 | Kitahara | H04N 1/00127 358/1.13 |
| 2009/0187713 A1 | 7/2009 | Zedlewski et al. | |
| 2009/0198833 A1 | 8/2009 | Kisel et al. | |
| 2009/0199175 A1 | 8/2009 | Keller et al. | |
| 2009/0327478 A1 | 12/2009 | Krause | |
| 2010/0070570 A1 | 3/2010 | Lepeska | |
| 2010/0095331 A1 | 4/2010 | Hilt et al. | |
| 2010/0111059 A1 | 5/2010 | Bappu | |
| 2010/0146569 A1 | 5/2010 | Janardhan | |
| 2010/0169392 A1 | 7/2010 | Lev Ran et al. | |
| 2010/0235329 A1 | 9/2010 | Koren et al. | |
| 2010/0306399 A1 | 12/2010 | Khosravi et al. | |
| 2010/0325410 A1 | 12/2010 | Fitzgerald et al. | |
| 2011/0060812 A1 | 3/2011 | Middleton | |
| 2011/0119434 A1 | 5/2011 | Brown | |
| 2011/0307310 A1 | 12/2011 | Kamat | |
| 2012/0117649 A1 | 5/2012 | Holloway et al. | |
| 2012/0159558 A1 | 6/2012 | Whyte | |
| 2012/0221697 A1 | 8/2012 | Sainio et al. | |
| 2012/0323349 A9 | 12/2012 | Khedouri et al. | |
| 2013/0031199 A1 | 1/2013 | Clerc et al. | |
| 2013/0311591 A1 | 11/2013 | Zacke et al. | |
| 2014/0115090 A1 | 4/2014 | Hasek | |
| 2014/0250076 A1* | 9/2014 | Lad | G06F 16/128 707/639 |
| 2014/0331330 A1* | 11/2014 | Abhijeet | H04L 67/06 726/26 |

OTHER PUBLICATIONS

Clerc, et al., "OS Streaming Deployment", IEEE 29$^{th}$ International Performance Computing and Communications Conference (IPCCC), Dec. 9-11, 2010, Albuquerque, NM, pp. 169-179, doi: 10.1109/PCCC.2010.5682313.

Xiao, et al., "New Insights on Internet Streaming and IPTV", CIVR'08, Jul. 7-9, 2008, Niagara Falls, Ontario, Canada, 2008 ACM 978-1-60558-070-8/08/07, pp. 645-653.

U.S. Office Action dated Mar. 3, 2014, in U.S. Appl. No. 13/483,141.

Response to Non-Final Office Action dated Mar. 3, 2014 in U.S. Appl. No. 13/483,141, filed Apr. 29, 2014.

U.S. Final Office Action dated Sep. 22, 2014, in U.S. Appl. No. 13/483,141.

Response to Non-Final Office Action dated Sep. 22, 2014 in U.S. Appl. No. 13/483,141, filed Dec. 19, 2014.

U.S. Non-Final Office Action dated Jul. 17, 2015, in U.S. Appl. No. 13/483,141.

U.S. Final Office Action dated Dec. 4, 2015, in U.S. Appl. No. 13/483,141.

U.S. Non-Final Office Action dated May 20, 20, 2016 in U.S. Appl. No. 13/483,141.

U.S. Non-Final Office Action dated May 20, 2016, in U.S. Appl. No. 13/483,141.

U.S. Office Action dated Jul. 5, 2017, in U.S. Appl. No. 13/483,141.
U.S. Office Action dated Oct. 17, 2017, in U.S. Appl. No. 13/483,141.
U.S. Office Action dated Mar. 15, 2018, in U.S. Appl. No. 13/483,141.

* cited by examiner

TRANSMITTING DATA INCLUDING PIECES OF DATA

CROSS-REFERENCE TO RELATED APPLICATION

This application is a continuation of and claims priority from U.S. patent application Ser. No. 13/597,651, filed Aug. 29, 2012, which is a continuation of U.S. application Ser. No. 13/483,141, which in turn claims priority under 35 U.S.C. § 119 from European Patent Application No. 11168100.3 filed May 30, 2011, the entire contents of both are incorporated herein by reference.

BACKGROUND OF THE INVENTION

Field of the Invention

The present invention relates to the field of communication networks. More particularly, the present invention relates to the sending or the receiving of data including pieces of data.

Description of Related Art

A communication network usually includes at least one server and clients connected to the server. In such a communication network, the server stores data in a repository memory. The server can send such data to the clients when requested to do so. Usually, the data include pieces of data. The server can send one piece of data at a time via a cache memory of the repository, upon requests of clients. Data transmission is mentioned in documents such as U.S. Pat. No. 6,374,254 and U.S. Patent Publication No. 2007/0174873. Cache memory is mentioned in documents such as U.S. Patent Publication No. 2009/0187713 and U.S. Pat. No. 7,143,143.

The use of a cache is not entirely efficient, especially when the network includes a large number of clients and/or the data is large and include many pieces of data. Thus, there can be a long delay in receiving the whole data for clients.

Accordingly, streaming solutions have been developed. Namely, pieces of data are copied as they are required. Streaming is mentioned in different publications, such as "OS Streaming Deployment" by D. Clerc, L. Garcés-Erice, and S. Rooney in Proceeding of IPCCC'10, "New insights on internet streaming and iptv" by Z. Xiao and F. Ye in Proceedings CIVR'08, U.S. Patent Publication No. 2009/0199175, U.S. Patent Publication No. 2010/0306399, and U.S. Patent Publication No. 2010/0325410. Furthermore, other solutions are presented in documents U.S. Pat. No. 7,398,382 and WO 2009/042327. However, these solutions can still be improved.

There is a thus a need for an improved solution for transmitting data on a communication network.

SUMMARY OF THE INVENTION

Accordingly, one aspect of the present invention provides a method of sending data including pieces of data, the method including the steps of: placing a piece of data on at least one cache memory; and sending a signal indicating a presence of the piece of data on the cache memory to at least one client, where at least one of the steps is carried out by a computer device.

Another aspect of the present invention provides a method of receiving data including pieces of data, the method including the steps of: receiving a signal indicating a presence of a piece of data on a cache memory, where at least one of the steps is carried out by a computer device.

Another aspect of the present invention provides a server system including: a repository memory; a cache memory; a network interface; and a processor configured to: place a piece of data on at least one cache memory; and send a signal indicating a presence of the piece of data on the cache memory to at least one client.

Another aspect of the present invention provides a client system including: a memory; a network interface; and a processor configured to: receive a signal indicating a presence of a piece of data on a cache memory.

DETAILED DESCRIPTION OF THE PREFERRED EMBODIMENTS

Figure 1:
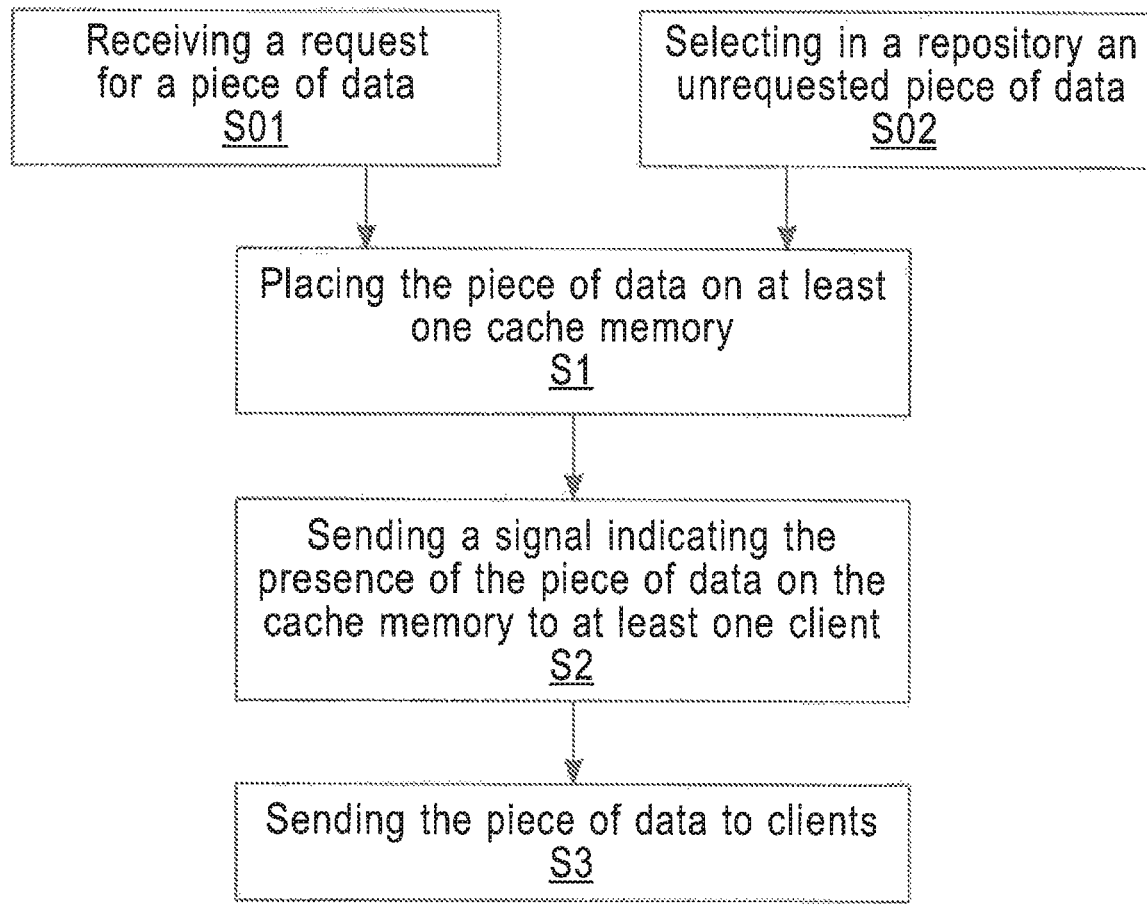
FIG. 1 shows a flowchart of the method for sending data implemented by a server according to an embodiment of the present invention.

The above and other features of the present invention will become more distinct by a detailed description of embodiments shown in combination with attached drawings. Identical reference numbers represent the same or similar parts in the attached drawings of the invention.

As will be appreciated by one skilled in the art, aspects of the present invention can be embodied as a system, method or computer program product. Accordingly, aspects of the present invention can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present invention can take the form of a computer program product embodied in one or more computer readable medium(s) having computer readable program code embodied thereon.

Any combination of one or more computer readable medium(s) can be utilized. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

Computer program code for carrying out operations for aspects of the present invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

According to one aspect, the invention is embodied as a method implemented by a server system for sending data including pieces of data. The method includes placing a piece of data on at least one cache memory and sending a signal indicating the presence of the piece of data on the cache memory to at least one client.

According to another aspect, the invention is embodied as a server system. The server includes a repository memory, a cache memory, a network interface, a processor, and recorded instructions that cause the processor to perform the above method for sending data.

According to another aspect, the invention is embodied as a computer program including instructions for performing the method for sending data.

According to another aspect, the invention is embodied as a data storage medium having recorded thereon the computer program including instructions for performing the method for sending data.

According to another aspect, the invention is embodied as a method implemented by a client system for receiving data including pieces of data. The method includes receiving a signal indicating the presence of a piece of data on a cache memory.

According to another aspect, the invention is embodied as a client system. The client system includes a memory, a network interface, a processor, and recorded instruction that cause the processor to perform the method for receiving data.

According to another aspect, the invention is embodied as a computer program including instructions for performing the method for receiving data.

According to another aspect, the invention is embodied as a data storage medium having recorded thereon the computer program including instructions for performing the method for receiving data.

According to another aspect, the invention is embodied as a method for transmitting data. The method for transmitting data includes performing the method for sending data by at least one server, and performing the method for receiving data by at least one client. The server sends the signal indicating the presence of the piece of data on the cache memory to at least two clients, preferably all the clients of a network.

According to another aspect, the invention is embodied as a system for performing the method for transmitting data including at least one server and at least two clients.

A "cache" memory is, as widely known in the art, a transient memory of the server. In other words, a cache memory is a memory which is erased when the server is switched off.

By "repository" memory, it is meant any type of persistent memory of the server, as widely known in the art. In other words, a repository memory is a memory which is not erased even if the server is switched off. By "piece of data", it is meant any block of data constituting the whole data that are to be transmitted (i.e. sent or received).

Sending a signal indicating the presence of the piece of data on the cache memory to at least one client can include broadcasting the signal on a network by the server. Clients monitoring the server can then receive the signal.

Thus, receiving a signal indicating the presence of a piece of data on a cache memory can mean for a client a client receiving a signal indicating the presence of a piece of data on a cache memory of a monitored server.

The invention improves the scalability and performance of data transmission. The idea of the method is to improve the use of the high throughput of a cache to efficiently transmit data from servers to clients. The methods, programs and systems of the invention perform this improvement by means of a signal that indicates the presence of the piece of data on the cache memory of a server. By signaling the presence of the piece of data on the cache memory of the server, the invention can offer several advantages:

- all clients receiving the signal can access the piece of data present on the cache memory;
- the cache memory allows a fast transmission, faster than should the data be accessed when it is in a repository memory;
- the server has an improved scalability, as more clients can be fed from the server and/or more pieces of data can be transmitted for a given time; and/or
- the cache memory does not allow the placing of a too high amount of data but offers fast transmission from the server to a client for the particular piece of data present on the cache memory.

In embodiments, the method for sending data can include one or more of the following features:

- the method includes receiving a request for the piece of data and placing the requested piece of data on the cache;
- the method includes selecting in a repository an unrequested piece of data and placing the selected piece of data on the cache;
- selecting the unrequested piece of data includes evaluating a likeliness of the unrequested piece of data to be requested;
- the method includes gathering the pieces of data into groups of similar pieces of data and attributing a respective cache to each group;
- the signal includes an identifier of the piece of data;
- the data include an operating system image;
- communication (i.e. a sending or a receiving) can be performed via an iSCSI interface (e.g. an iSCSI target).

In embodiments, the method for receiving data can include one or more of the following features:

- the method includes sending a request for the piece of data and receiving a signal indicating the presence of the requested piece of data;
- the method includes receiving a signal indicating the presence of an unrequested piece of data and evaluating a need for the received piece of data;
- evaluating a need for the received piece of data includes determining if the received piece of data is already present in a memory;
- the signal includes an identifier of the piece of data;
- the data include an operating system image;
- communication (i.e. a sending or a receiving) can be performed via an iSCSI interface (e.g. an iSCSI initiator).

In an embodiment, a piece of data is put into the cache, and the clients receive the signal that indicates that such piece is available. All the clients that are downloading the full content of the data and need the piece of data can request that piece of data. The clients all benefit from fast access to the cached data in such a case. While the piece of data in the cache is being transmitted, the server can read more data from repository disk memory and put such new data into the cache. The server can signal this new data with a new signal. Such a method can be iterated until the whole data are fully transmitted. The full transmission is performed fast.

The main point of the invention is to use a signaling mechanism to enhance the transfer of data. By signaling the presence of a piece of data on a cache, the server allows clients that have not requested the piece of data to download the piece of data. Thus, the method can exclude sending data to one client solely based upon requests of the client for pieces of data. Rather, the method provides the possibility to clients to be aware of a potentially interesting piece of data on a cache, and receive it in a fast way, as it is on cache memory. The invention thus improves the scalability of a server using such mechanism.

A random access method, which is a hypothetical method different from the methods of the invention, is now discussed for illustrating the above advantages. The performance of any data transmission mechanism depends on the piece of data being requested by a client at any point in time being available from the memory of the machine serving the data (i.e. the server). Disk I/O is orders of magnitude slower than access to RAM, i.e. MByte/Sec rather than Gigabyte/Sec. Moreover, magnetic disks have low efficiency at random access, typically having millisecond seek/rotate times as the disk head is moved to the appropriate sector. So for example, given a 1 ms seek/rotate latency if one accesses data random over the disk in units of 4 Kilobytes, one cannot achieve a better throughput than 4 MByte/Sec with such a random access method, even if the read-in-place throughput of the disk is a 100 MByte/Sec. Moreover, as the content requests can arrive for more and more different pieces of data, disk I/O degrades even further, as ulterior requests cannot benefit from the read-ahead of the disk heads over the contents of a given piece of data: each access to disk requires repositioning of the reading heads, and I/O performance collapses. Thus, there is a limit to the number of pieces of data and the number of clients that can be efficiently provisioned from a given server with random access methods. The main problem with such a random access method can be that it is in general not possible to predict a priori which pieces of data are going to be requested by which client. A best effort cache can put the pieces of data that are requested in a cache memory, in the hope that they can be requested again. However, if there is no correlation between the requests received, other parts can need to be brought into the cache, eventually filling it up. The cache can thus discard some of the image parts in the cache to allow for new ones, but this can not be using the cache efficiently because most of the accesses can end up requiring direct access to the disk, nullifying the purpose of having a cache, and degrading performance.

As opposed to this random access method, the signaling mechanism of the invention helps overcome this problem, enabling the transmission of more data to a larger number of clients, e.g. using substantially the same hardware resources. This is especially useful for example in Cloud environments, where many clients (e.g., virtual machines) can access or download simultaneously data such as one or more operating system images. In such a case, the signaling improves the number of clients that can be provisioned efficiently for a given infrastructure, providing clear value by extending the capabilities of currently deployed systems.

Figure 2:
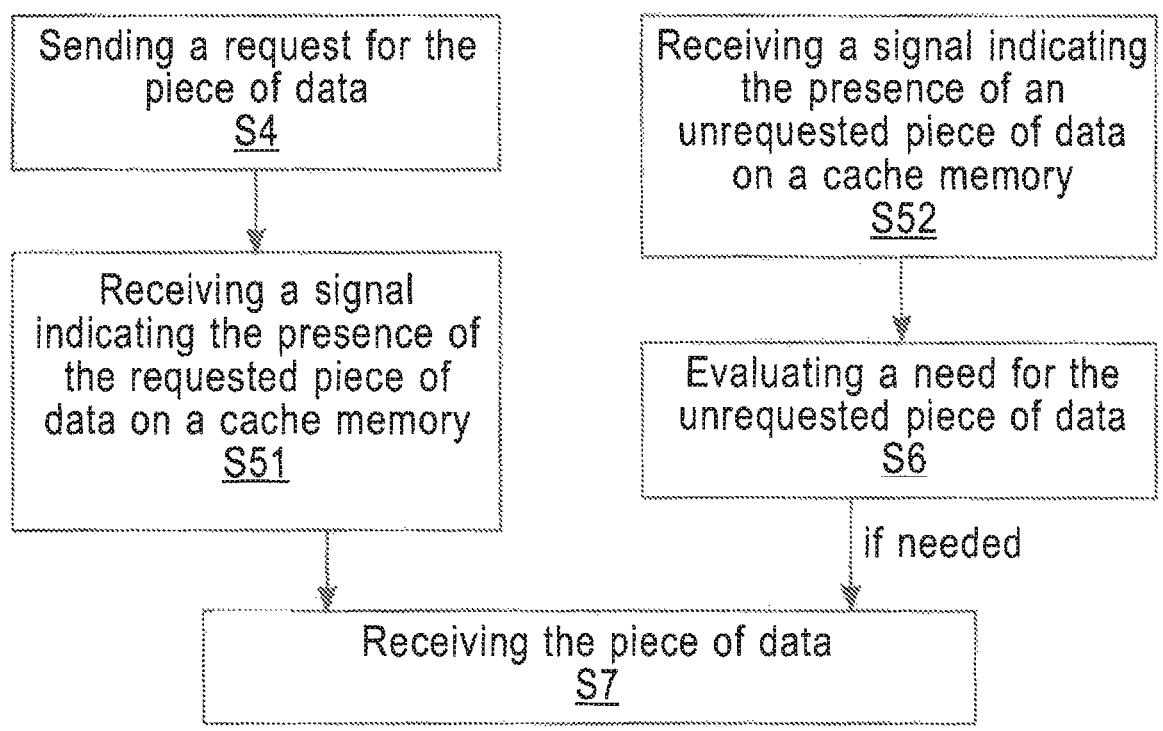
FIG. 2 shows a flowchart of the method for receiving data implemented by the client according to an embodiment of the present invention.
Figure 3:
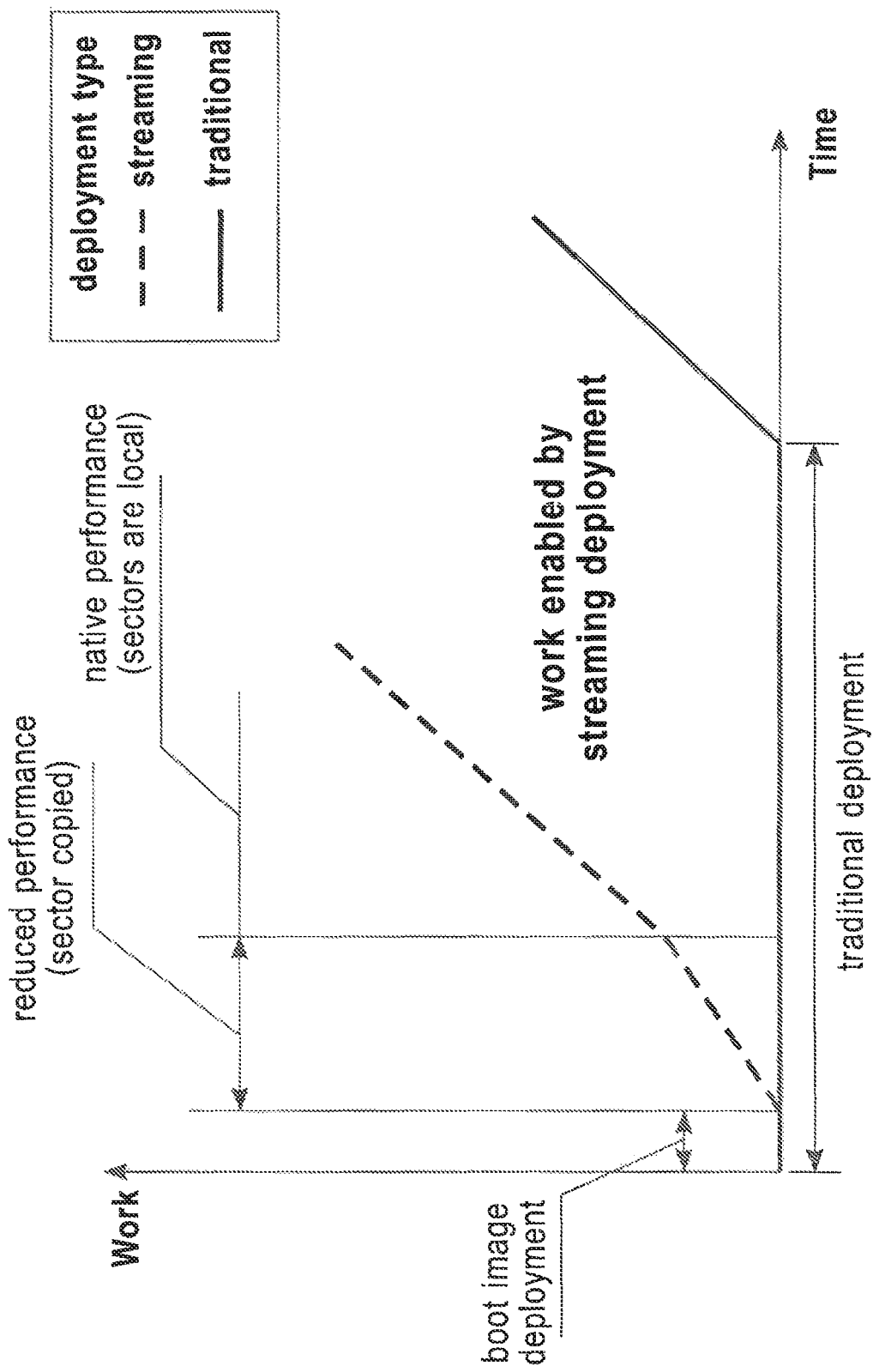
FIG. 3 shows an example of benefits of streaming according to an embodiment of the present invention.

Now, it is referred to FIGS. 1-3 which represent examples of the methods of the invention.

FIG. 1 represents an example of the method for sending data implemented by a server. It must be noted that several servers can be implementing the method in parallel. In the example, the method includes receiving (S01) a request for a piece of data and/or selecting (S02) in a repository an unrequested piece of data. A request for a piece of data comes from outside the server. Such selecting (S02) is not performed based on an outside request, but fully by a controller on the server. In any case, the method includes placing (S1) in the cache the piece of data received at (S01) and/or the piece of data selected at (S02). For example, the server can have several caches and can thus perform, e.g. substantially in parallel, one or several instances of (S01) followed by (S1) and/or one or several instances of (S02) followed by (S1), such instances being possibly iterated. The method of the example also includes sending (S2) a signal indicating the presence of the piece of data on the cache memory to at least one client. For example, the signal includes an identifier of the piece of data, such as a block number of a given disk, a given offset/location/size in a file of data. The cache(s) contemplated in the method is (are) different from the cache of the repository. For management efficiency purposes, the cache can be located on the server. However, the signaling is performed easier if the cache is different from a repository cache. Thus, the cache can be a cache of the server different from a repository cache. If the piece of data is required by a client (for example because the request received at (S01) came from the client or the client is signaled that the piece of data is in the cache and needs the piece of data), then the method also includes sending (S3) the piece of data to such client (e.g. at least one client requesting the send).

FIG. 2 represents an example of the method for receiving data implemented by the client. It must be noted that several clients can be implementing the method in parallel. It must also be noted that the methods of FIG. 1 and the methods of FIG. 2 can be interrelated, the client(s) receiving piece(s) data from the server(s) sending the piece(s) of data. In the example, the method includes sending (S4) a request for the piece of data. After that, the method includes receiving (S51) a signal indicating the presence of the requested piece of data on a cache memory, e.g. of a server, e.g. a server which have received and accepted the request (such as explained referring to FIG. 1). Alternately or substantially in parallel, the client can receive (S52) a signal indicating the presence of an unrequested piece of data on a cache memory. The client can then evaluate (S6) a need for the unrequested piece of data. In such a case, the signal indicates the presence of data which was not asked by the client but put on the cache anyway, for example because it has been requested by another client and has been put on the cache of a server anyway. Thus, the signaling mechanism allows traditional client requests but improves the transmitting of data by adding the possibility for a client to receive unrequested pieces of data. For this, the method includes evaluating (S6) a need for the unrequested piece of data. For example, the client can determine if the received piece of data is already present in a memory (of the client) and e.g. download the piece of data if it is not present. Or, the client can determine if the piece of data completes other pieces of data already present in a memory of the client. Then, the client receives (S7) the piece of data if it is indeed a needed piece of data, for example by launching a download protocol.

The sending and receiving methods can thus combine transmission (i.e. sending (by server) and receiving (by client) pieces of data) which is "on demand" (i.e. a client receives a piece of data which the client has requested) to transmission via the signaling mechanism (i.e. a client receives a piece data because the client has received a signal indicating the presence of the piece of data on the cache and the client needs the piece of data). This allows for a higher efficiency. Indeed, data is transmitted both ways, and the transmission via signaling mechanism avoids waiting for the piece of data to be requested.

For example, selecting (S02) the unrequested piece of data can include evaluating a likelihood of the unrequested piece of data to be requested. Typically, a controller of the server analyses the data in the repository and selects a piece of data which has high probability of being requested. Placing such a piece of data on the cache before it is requested makes the transmission faster. For example, the controller can analyze the requests and perform statistics to rank the remaining unrequested pieces of data in a list according to their likelihood to be requested. Then, one by one, the controller can place these data on dedicated caches. Of course, the list can be decreased as some of the pieces of data of the list are actually requested by a client and placed on a cache thereafter.

Now, an example of the method is discussed in the case the data includes an operating system image. In such a case, communication via iSCSI interfaces of the server and/or the client is particularly efficient for transmitting pieces of data which are parts of the operating system image.

A computer uses a collection of software to perform tasks. This collection is usually formed by an operating system (OS), which provides the interface to the underlying hardware, and applications, which use the OS to run in a given machine. Such a software collection can be stored in the form of an operating system image, or simply "image", which is a representation of a disk with the OS and applications already installed. In any complex computer infrastructure, be it a data center (physical machines) or a Cloud (virtual machines), a library of images can be maintained so that any computer at any point in time can perform a given task, defined by the logic in the image that is installed on that particular computer. In those complex environments, working with images is preferred to installing the software stack from the source media, as transferring the content of the image to the target computer is faster than going through the installation process of every item of the desired software stack.

Images are usually large, each of them containing Gigabytes of data. These images are stored in some repository in a central location (i.e. the server), whose simplest form consists in having a file per image in a filesystem on a storage device such as a disk (i.e. a repository). For a machine (i.e. a client) to make use of one of these images, the image contents must be copied over the network to the disk of the machine. Given the large size of the images, this is a costly operation that takes a long time even on powerful hardware.

The method can thus transfer the image contents on-demand, using a streaming approach. The image is made available through an iSCSI target, and an iSCSI initiator on the client pulls the contents of the image as the OS booting and the applications working requests them. As a result, portions of the image that are not needed for a particular scenario are not transferred to the disk of the client machine. A streaming deployment has the advantage over a conventional deployment that the OS can be used during the deployment itself. FIG. 3 shows this benefit schematically, by representing how the earlier utilization of resources with streaming deployment results in more work being done faster on the client which is receiving the data using streaming.

The method can aim at transferring 100% of the content of the image to the client machine. This is advantageous if the client machine is expected to be disconnected from the server and thus the central repository of images in the future. In this approach, to complete the deployment, all the contents of the image must be transferred to the client's disk memory.

In general, signaling the presence of a piece of data is particularly advantageous in all cases that streaming is used but the whole data is eventually needed by clients. Indeed, in such cases, a client acquires some pieces of data through the streaming, i.e. on demand. But in the meantime, the client can acquire data not requested yet by the client through the signaling mechanism. This is discussed by way of examples hereunder.

A naïve way of performing such a complete transfer can be to wait for the client to eventually browse all the pieces of the whole image while streaming. However, it can be prohibitively slow to wait for the normal operation of the machine to request everything on the image through streaming, or this can actually never happen because not everything on the image is necessary for the machine to perform its assigned task.

Thus, the method can introduce a mechanism that combines with a streaming infrastructure already in place, such that the method does not have a separate transmission channel that has to write to the client's disk at the same time, which can be complex and error-prone. Namely, in parallel to the streaming (sending pieces of data on-demand, e.g. by the server to the client), the method includes completing the image by placing unrequested pieces of data on a cache of the server and signaling their presence to the clients. The clients can thus complete the image while continuing the streaming. The method thus improves performance for image streaming, while at the same time allowing an efficient process of downloading the full content of the image. The approach of the method is more adequate in the case of streaming images to machines, because it limits the amount of resources needed by the image server by using a single infrastructure, i.e. using the same memory cache areas for both streaming and image completion. The image data gets into the client's disk through a single point, avoiding any race conditions, data corruption, or requiring complex coordination mechanisms between the streaming infrastructure and the complementary data distribution.

The method optimizes the distribution of an identical or similar image to a large number of clients from a single or much smaller number of servers (the image being stored on a repository on the server). The clients start at a similar moment in time and request the parts of the operating system that permits them to boot from the server. This can correspond to an occasional upgrade of a set of hosted machines within an organization e.g. the installation of a new version of Windows, or a frequent activity due to the requirements of dynamically varying load, e.g. deploying a clean setup for analytics on a scientific cluster.

While the clients start at the same moment, the resources that they possess can be different, meaning that the progress they make can differ. After a certain moment a client can have enough of the operating system to run and can start user-level applications. The disk blocks (the term "block" being conveniently used here to designate a piece of data) can be streamed from the server to the client's disk as requested by disk operations made by the operating system. The deployment of the client is the to be complete when all blocks that contain data have been copied (blocks that are not used by the file system—free blocks—do not need to be copied).

With such a method, the deployment of the client does not have to wait until the application has accessed every block on disk. Instead, an agent running on the client can proactively request blocks that have not yet been accessed when the client can otherwise be idle, eventually leading to all blocks being streamed from the server to the client's disk. A distinction can be made of the blocks that the client needs in order to complete current user-level tasks and blocks that are required to complete the deployment. The method takes advantage of the fact that the latter can be accessed in any order to optimize server side disk access. It can achieve this by allowing the server to periodically signal to the client which blocks are available from the server's memory cache areas, and will therefore not require a fetch from the server's disk. The agent running on the client can merge its knowledge of what has already been streamed to its local disk with what is currently available at the server's cache to be selective in the blocks it request to complete the deployment. In particular, if there are blocks that are available in the server cache that it has not already read, then the client can privilege the downloading of these blocks.

On the server side, a streaming component can communicate with the underlying image storage infrastructure to control the memory cache areas where blocks needed by clients are stored. The default behaviour can be for the server to cache blocks that have been recently accessed and discard least recently used blocks. If the image storage infrastructure is able to determine how similar images are, it can group images by similarity, to instruct the streaming component to use a different memory cache for each image group. The storage infrastructure can determine similarity between images by using a single instance storage capability, where blocks that have the same content in multiple images are only stored once, thanks to a content signature algorithm that helps identifying the content of the blocks. In general, the server can thus gather the pieces of data into groups of similar pieces of data and attribute a respective cache to each group.

As an additional optimization, the storage infrastructure can use a statistical analysis on blocks being requested by the streaming component to group blocks together, by the likelihood that a block is associated with another block (i.e. belonging to the same operating system task). This statistical relationship can be used to populate memory caches with blocks that are very likely to be requested by the clients, based on the current activity made by the clients.

Figure 4:
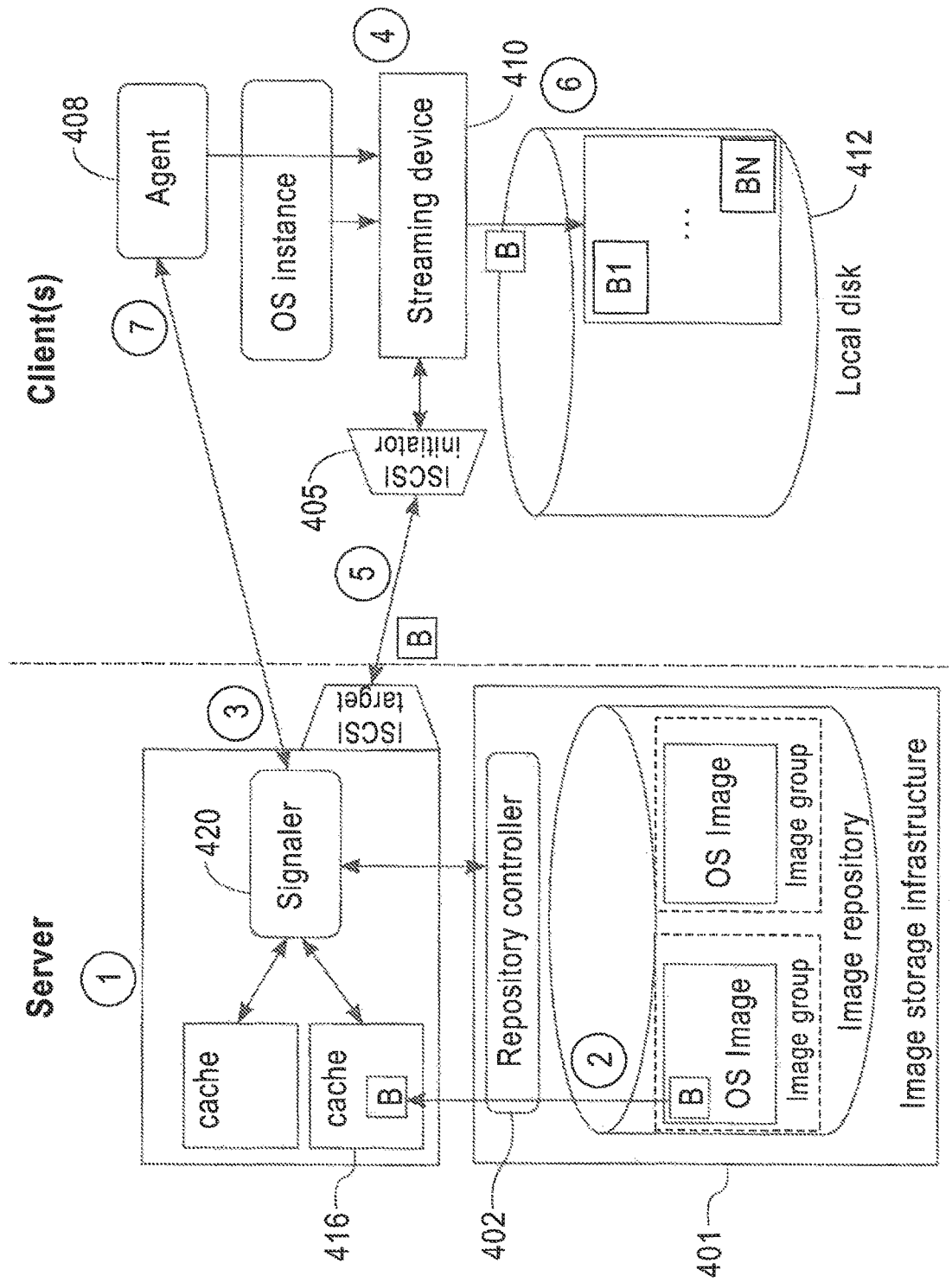
FIG. 4 shows different components in an example and how they interact for performing a method of communication of the present invention.

Typically, in the case of multiple similar images, the sequence of blocks accessed during the boot sequence is mostly identical across these similar images. A further optimization consists in having on the server side a specific caching area destined to accommodate boot sequence blocks. This allows to significantly improve images booting time. FIG. 4 shows the different components in an example and how they interact for performing a method of communication of the invention. The steps describing the interaction process are numbered in circles. In this example, the streaming infrastructure is already in place. Thus images can be streamed to machines on-demand through the use of a streaming device 410. Images are located in a repository 401, and clients request image contents to the repository 401 through iSCSI interface 405.

A detailed description of the steps of an example of a method of transmitting data over the network of FIG. 4 including a server and clients follows, referring to the circled numbers of FIG. 4:

1. The method of the example includes streaming an image to a number of clients.
2. In parallel to the streaming, the method includes introducing by a signaler 420 of the server a piece of data B from the image repository 401 into a cache 416 between the iSCSI target and the the images themselves. The selection of what data to pull from the repository 401 can be made using information given by the image storage infrastructure. The signaler 420 can for example pull the piece of data B from the image in the repository 401, and places it in the corresponding memory cache 416 for the image group.
3. The method includes signaling to clients that the piece of data B, corresponding to some portion of the image, is available for faster access.
4. The method includes requesting by an agent 408 on the client machines the download of the data available in the cache 416, e.g. using the same mechanism that any other application or the OS itself uses, e.g. sending a request to the streaming driver. This can be achieved directly through special device calls or by simply accessing the portion of the disk corresponding to B and triggering the request of the data in the cache 416.
5. If necessary, the data is transferred through the iSCSI connection from the server to the local disk 412. If parts of it are already on disk, only the required data is downloaded.
6. The image data block B is written to local disk 412.
7. The agent 408 can inform the signaler 420 when the data is found on the local disk 412. Once all clients are finished, the signaler 420 can repeat the process with subsequent portions of the image.

A driver can be used to write the contents to the local disk 412 on the client as the OS and applications demand them. The agent 408 can request arbitrary data from the local disk 412. The agent 408 can also request the data by directly contacting a streaming driver. A fraction of the data in the image can be pulled into the server cache 416, and it is signaled to the agents in the clients. This can be the case when the fraction is common to several pieces of data in order to increase efficiency.

The storage infrastructure can be made of the repository 401 of image data, and a controller 402 that can perform some analysis on the image data (image similarity, statistical relationships between blocks). The method can include introducing data into the cache 416 using information received by the storage infrastructure's controller 402. A fraction of the data in the image mat pulled into the server cache, and it is signaled to the agents in the clients. A specific cache can be used to store the blocks used for images boot sequences. Indeed, the boot sequences are the requirements and providing such specific cache minimizes the boot image deployment duration of FIG. 4.

Fast scalable access is guaranteed for the whole of the image, so it can be efficiently transferred to all clients. This mechanism can be generalized for other on-demand data distribution schemes that need to be completed fast and reliably.

The benefit of this approach can be simply presented as hereafter. Assume there are C clients and 1 server. Assume that an image can be divided into N identically sized chunks all of size M bytes, i.e. the image is of size $I=N*M$. Assume that the disk throughput is 10 MBbyte/Sec on average. Assume, the cache throughput is 1 GByte/Sec. Assume that the cache size is 10% of the size of the image, i.e. the cache is of size I/10. In the absolute worst case scenario of the method, every block must be read from disk, i.e. the time taken to read the image is $(C*I)/10^7$ seconds. In the absolute best case, the image is read once from disk and then the rest of the time from cache, i.e. the time is $I/10^7+I*(C-1)/10^9$. Thus, for example, assume an image of size I=10 GByte and C=100 clients. In the worst case it can take $(100*10^{10})/10^7=10^5$ seconds or 27 hours. In the absolute best case $10^{10}/10^7+10^{10}*99/10^9 \approx 2,000$ seconds or 30 minutes. While these figures are only schematic, they give an indication how much signaling the cache contents allow the invention to achieve multiple orders of magnitude throughput.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 5:
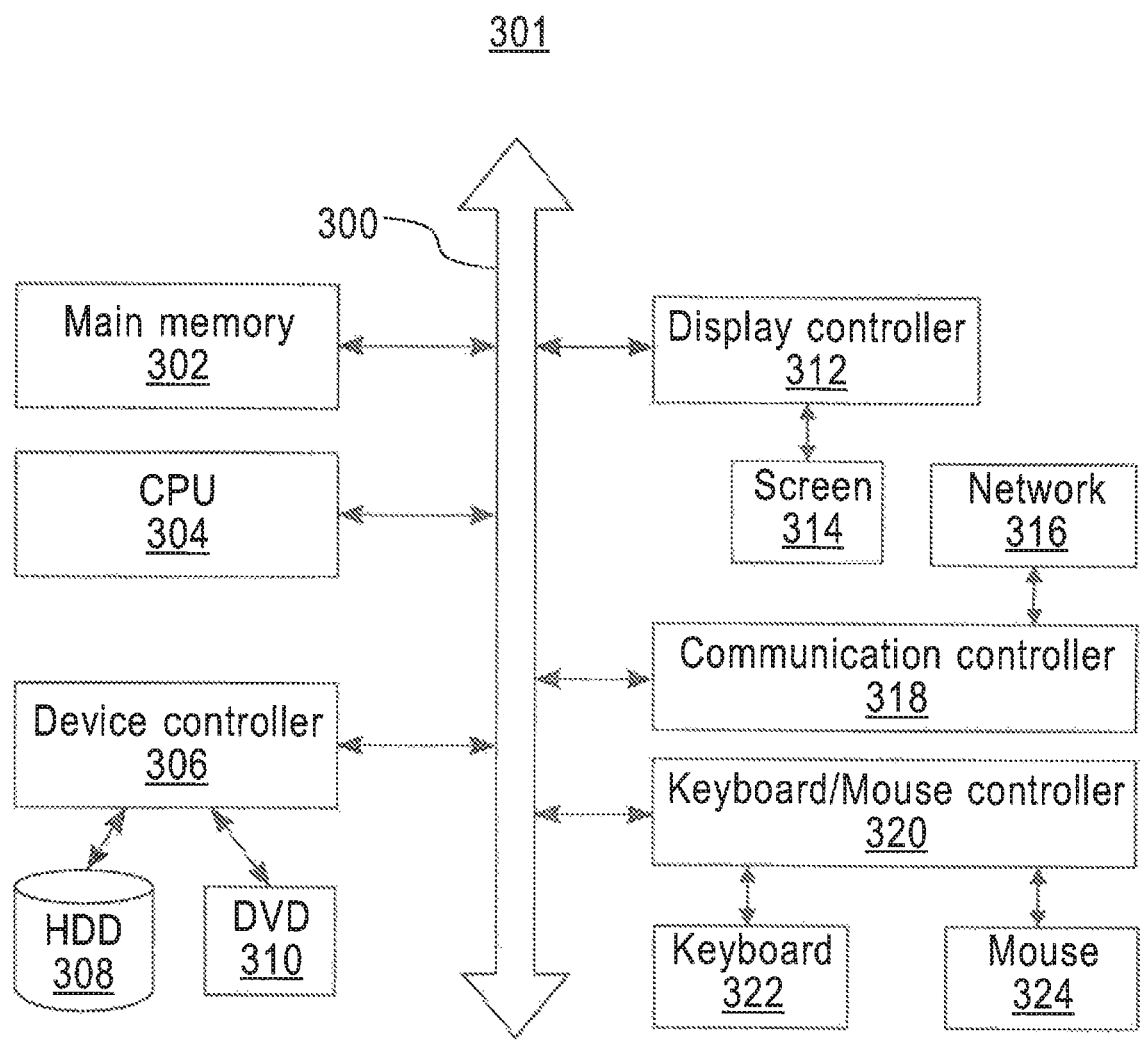
FIG. 5 is a block diagram of computer hardware according to an embodiment of the present invention.

FIG. 5 is a block diagram of computer hardware according to an embodiment of the invention, which can be a client system. A computer system (301) according to an embodiment of the invention includes a CPU (304) and a main memory (302), both of which are connected to a bus (300). The bus (300) is connected to a display controller (312), which in turn is connected to a display (314) such as an LCD monitor. The display (314) is used to display information about a computer system. The bus (300) is also connected to a storage device such hard disk (308) or DVD (310) through a device controller (306) such as an IDE or SATA controller. The bus (300) is further connected to a keyboard (322) and a mouse (324) through a keyboard/mouse controller (310) or a USB controller (not shown). The bus is also connected to a communication controller (318) conforms to, for example, an Ethernet (registered trademark) protocol. The communication controller (318) is used to physically connect the computer system (301) with a network (316).

A server system of an embodiment can sensibly be represented by block diagram of computer hardware. In the case of the server, the hard disk 308 can be a repository and the server has at least one cache in addition to the repository (the repository having at least one own cache).

What is claimed is:

1. A computer implemented method comprising:
   storing data in a server;
   selecting a block of data from the stored data;
   storing the selected block of data in a cache memory of the server; and
   transmitting a block availability signal to a client, the block availability signal including an identifier of the selected block of data and indicating that the selected block of data is stored in the cache memory and is available to be accessed by the client,
   wherein the client comprises a plurality of clients and the transmitting of the block availability signal comprises transmitting the block availability signal to the plurality of clients over a communication network.

2. A computer implemented method of claim 1, wherein the server comprises a repository server system and the data is stored in a repository memory of the repository server system,
   wherein the transmitting of the block availability signal comprises transmitting the block availability signal by a signaler of the repository server system, and
   wherein the block of data selected by the repository server system comprises an unrequested block of data for which the repository server system has not received a request from the plurality of clients.

3. The computer implemented method of claim 2, wherein the repository server system comprises an image repository server system,
   wherein the data stored in the repository memory comprises a plurality of images including a first image, each image of the plurality of images including an operating system and a set of applications,
   wherein the block of data comprises a portion of image data of the first image,
   wherein the cache memory comprises a first cache memory of a plurality of cache memories, and
   wherein the storing of the selected block of data in the cache memory comprises copying the block of data to the first cache memory.

4. The computer implemented method of claim 3, wherein the first image belongs to a first image group of a plurality of image groups, and
   wherein the method further comprises:
      selecting the first cache memory as a cache memory which corresponds to the first image group.

5. The computer implemented method of claim 3, further comprising:
   responsive to the transmitting of the block availability signal, receiving, by the image repository server system from a requesting client of the plurality of clients over the communication network, a request for a requested portion of the block of data; and
   sending, over the communication network, the requested portion of the block of data to the requesting client.

6. The computer implemented method of claim 5, wherein the requested portion is sent in a form and format according to an Internet Small Computer System Interface (iSCSI) protocol.

7. The computer implemented method of claim 5, wherein the requested portion of the block of data corresponds to an entirety of the block of data.

8. The computer implemented method of claim 5, wherein the requested portion of the block of data is sent to a first local disk included in the requesting client.

9. A non-transitory computer program product comprising a computer readable storage medium having stored thereon:
   first program instructions programmed to store data in a server;
   second program instructions programmed to select a block of data from the stored data;
   third program instructions programmed to store the selected block of data in a cache memory of the server; and
   fourth program instructions programmed to transmit a block availability signal to a client, the block availability signal including an identifier of the selected block of data and indicating that the selected block of data is stored in the cache memory and is available to be accessed by the client,
   wherein the client comprises a plurality of clients and the transmitting of the block availability signal comprises transmitting the block availability signal to the plurality of clients over a communication network.

10. The computer program product of claim 9, wherein the server comprises a repository server system and the data is stored in a repository memory of the repository server system,
    wherein the transmitting of the block availability signal comprises transmitting the block availability signal by a signaler of the repository server system, and
    wherein the block of data selected by the repository server system comprises an unrequested block of data for which the repository server system has not received a request from the plurality of clients.

11. The computer program product of claim 10, wherein the repository server system comprises an image repository server system,
    wherein the data stored in the repository memory comprises a plurality of images including a first image, each image of the plurality of images including an operating system and a set of applications,
    wherein the block of data comprises a portion of image data of the first image,
    wherein the cache memory comprises a first cache memory of a plurality of cache memories, and
    wherein the storing of the selected block of data in the cache memory comprises copying the block of data to the first cache memory.

12. The computer program product of claim 11, wherein the first image belongs to a first image group of a plurality of image groups, and
    wherein the medium has further stored thereon:
       fifth program instructions programmed to select the first cache memory as a cache memory which corresponds to the first image group.

13. The computer program product of claim 11, wherein the medium has further stored thereon:
    fifth program instructions programmed to, responsive to the transmitting of the block availability signal, receive by the image repository server system from a requesting client of the plurality of clients over the communication network, a request for a requested portion of the block of data; and sixth program instructions programmed to:
   send over the communication network, the requested portion of the block of data to the requesting client; and
   send the requested portion in a form and format according to an Internet Small Computer System Interface (iSCSI) protocol.

14. A computer system comprising:
a processor(s) set; and
a computer readable storage medium;
wherein the processor set is structured, located, connected and/or programmed to run program instructions stored on the computer readable storage medium, the program instructions including:
   first program instructions programmed to store data in a server;
   second program instructions programmed to select a block of data from the stored data;
   third program instructions programmed to store the selected block of data in a cache memory of the server; and
   fourth program instructions programmed to transmit a block availability signal to a client, the block availability signal including an identifier of the selected block of data and indicating that the selected block of data is stored in the cache memory and is available to be accessed by the client,
wherein the client comprises a plurality of clients and the transmitting of the block availability signal comprises transmitting the block availability signal to the plurality of clients over a communication network.

15. The computer system of claim 14, wherein the server comprises a repository server system and the data is stored in a repository memory of the repository server system,
   wherein the transmitting of the block availability signal comprises transmitting the block availability signal by a signaler of the repository server system, and
   wherein the block of data selected by the repository server system comprises an unrequested block of data for which the repository server system has not received a request from the plurality of clients.

16. The computer system of claim 15, wherein the repository server system comprises an image repository server system,
   wherein the data stored in the repository memory comprises a plurality of images including a first image, each image of the plurality of images including an operating system and a set of applications,
   wherein the block of data comprises a portion of image data of the first image,
   wherein the cache memory comprises a first cache memory of a plurality of cache memories, and
   wherein the storing of the selected block of data in the cache memory comprises copying the block of data to the first cache memory.

17. The computer implemented method of claim 1, wherein the server periodically transmits the block availability signal to a plurality of clients including the client.

18. The computer implemented method of claim 1, wherein the server transmits the block availability signal by broadcasting the block availability signal over a communication network to a plurality of clients including the client.

19. The computer implemented method of claim 1, wherein selecting of the block of data comprises:
   determining a probability that the block of data will be requested; and
   selecting the block of data based on the probability.

20. The computer implemented method of claim 1, wherein the identifier comprises one of a block number of the block of data, an offset of the block of data, a location of the block of data and a size of the block of data.

* * * * *